United States Patent
Marivoet et al.

(10) Patent No.: US 11,849,312 B2
(45) Date of Patent: Dec. 19, 2023

(54) AGENT DEVICE AND METHOD FOR OPERATING THE SAME

(71) Applicant: Sony Corporation, Tokyo (JP)

(72) Inventors: Philip Marivoet, Stuttgart (DE); Olivier Demarto, Stuttgart (DE); Tom Cool, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 220 days.

(21) Appl. No.: 16/979,859

(22) PCT Filed: Mar. 11, 2019

(86) PCT No.: PCT/EP2019/055966
§ 371 (c)(1),
(2) Date: Sep. 11, 2020

(87) PCT Pub. No.: WO2019/175083
PCT Pub. Date: Sep. 19, 2019

(65) Prior Publication Data
US 2021/0058775 A1   Feb. 25, 2021

(30) Foreign Application Priority Data
Mar. 13, 2018 (EP) .................... 18161538

(51) Int. Cl.
*H04W 12/02* (2009.01)
*H04W 12/64* (2021.01)

(52) U.S. Cl.
CPC .......... *H04W 12/02* (2013.01); *H04W 12/64* (2021.01)

(58) Field of Classification Search
CPC .............................. H04W 12/02; H04W 12/64
See application file for complete search history.

(56) References Cited

U.S. PATENT DOCUMENTS

| | | | |
|---|---|---|---|
| 7,013,006 B1* | 3/2006 | Tischer | H04M 1/72457 |
| | | | 455/418 |
| 7,283,044 B2 | 10/2007 | Bandy | |
| 8,782,426 B2 | 7/2014 | McQuaide, Jr. | |
| 9,230,560 B2 | 1/2016 | Ehsani et al. | |
| 9,672,491 B2 | 6/2017 | Tsatalos et al. | |

(Continued)

FOREIGN PATENT DOCUMENTS

| EP | 2629194 A2 | 8/2013 |
|---|---|---|
| EP | 3040955 A1 | 7/2016 |
| WO | 2018/136067 A1 | 7/2018 |

OTHER PUBLICATIONS

International Search Report and Written Opinion dated May 17, 2019 for PCT/EP2019/055966 filed on Mar. 11, 2019, 11 pages.

*Primary Examiner* — Robert B Leung
(74) *Attorney, Agent, or Firm* — XSENSUS LLP

(57) ABSTRACT

An agent device for assisting one or more users is provided. The agent device supports a first operation mode in which the agent device is configured to identify individual users. Further, the agent device supports a second operation mode in which the agent device is configured to not identify individual users. The agent device includes a receiver circuit configured to receive, from an external device, a signal indicating that a person in the vicinity of the agent device does not want to be identified. Additionally, the agent device includes a control circuit configured to set an operation mode of the agent device to the second operation mode in response to receiving the signal.

17 Claims, 2 Drawing Sheets

(56) References Cited

U.S. PATENT DOCUMENTS

| | | | |
|---|---|---|---|
| 11,146,537 B1* | 10/2021 | Kennedy | H04W 12/08 |
| 2005/0170850 A1* | 8/2005 | Edwards | H04W 48/02 |
| | | | 455/414.1 |
| 2014/0157424 A1* | 6/2014 | Lee | G06F 21/74 |
| | | | 726/26 |
| 2015/0156171 A1* | 6/2015 | Biswas | H04L 63/20 |
| | | | 726/26 |
| 2016/0198127 A1* | 7/2016 | Zhang | H04N 7/181 |
| | | | 348/153 |
| 2018/0025733 A1* | 1/2018 | Qian | G10L 15/22 |
| | | | 704/275 |

* cited by examiner

AGENT DEVICE AND METHOD FOR OPERATING THE SAME

CROSS-REFERENCE TO RELATED APPLICATIONS

The present application is based on PCT filing PCT/EP2019/055966, filed Mar. 11, 2019, which claims priority to EP 18161538.6, filed Mar. 13, 2018, the entire contents of each are incorporated herein by reference.

FIELD

The present disclosure relates to protecting user privacy when using an agent device. In particular, examples relate to an agent device for assisting one or more users, and a method of operating an agent device for assisting one or more users.

BACKGROUND

An agent device, for example a smart home device integrating an intelligent virtual assistant, commonly recognizes, identifies and/or distinguishes between people present in the vicinity. The agent device performs user recognition in order to serve users at its best capacity.

Some users do not want this recognition to happen in order to protect their privacy.

Hence, there may be a desire for an improved agent device.

SUMMARY

This desire is met by apparatuses and methods in accordance with the independent claims. Advantageous embodiments are addressed by the dependent claims.

According to an aspect, the present disclosure provides an agent device for assisting one or more users. The agent device supports a first operation mode in which the agent device is configured to identify individual users. Further, the agent device supports a second operation mode in which the agent device is configured to not identify individual users. The agent device comprises a receiver circuit configured to receive, from an external device, a signal indicating that a person in the vicinity of the agent device does not want to be identified. Additionally, the agent device comprises a control circuit configured to set an operation mode of the agent device to the second operation mode in response to receiving the signal.

According to another aspect, the present disclosure provides a method of operating an agent device for assisting one or more users. The agent device supports a first operation mode in which the agent device is configured to identify individual users. Further, the agent device supports a second operation mode in which the agent device is configured to not identify individual users. The method comprises receiving, from an external device, a signal indicating that a person in the vicinity of the agent device does not want to be identified. Additionally, the method comprises setting an operation mode of the agent device to the second operation mode in response to receiving the signal.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Unless otherwise defined, all terms (including technical and scientific terms) are used herein in their ordinary meaning of the art to which the examples belong.

Figure 1B:
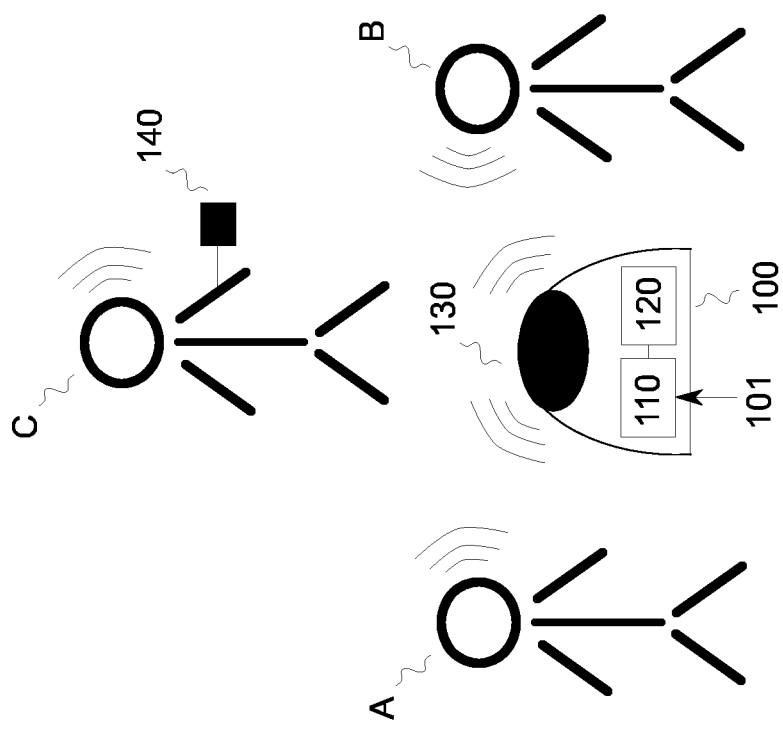
FIGS. 1a and 1b illustrate an agent device according to an embodiment in different situations.
Figure 1A:
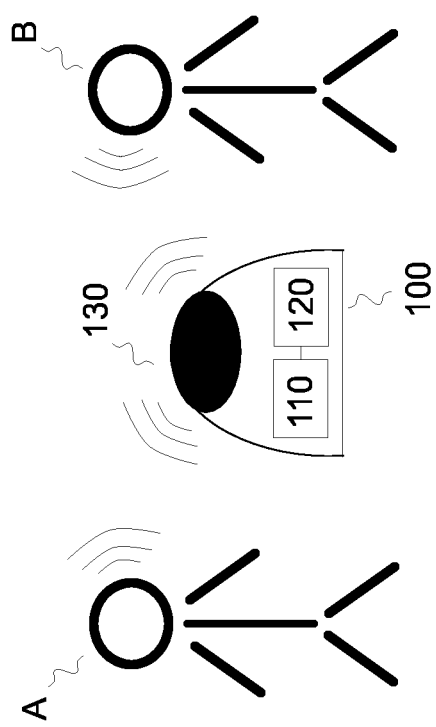

FIG. 1a illustrates an agent device 100 for assisting one or more users according to an embodiment together. Users A and B interact with agent device 100. Agent device 100 is a virtual assistant to the users A and B. In other words, agent device 100 is a platform for a software agent that can perform tasks or services for an individual. For example, agent device 100 may provide information such as weather or facts, set an alarm, make to-do lists or shopping lists, play music or videos from streaming services, or buy items on online sales platforms. Agent device 100 may be implemented into various types of physical platforms such as a smart speaker, an appliance, or a vehicle. The users A and B may, e.g., interact with agent device 100 via voice as indicated in FIG. 1a, gestures, and/or text (e.g. by typing a text into via an input device of agent device 100 or sending a message to agent device 100).

Agent device 100 supports a first operation mode in which the agent device is configured to identify individual users (persons). In other words, agent device 100 performs user recognition in the first operation mode. User recognition may be performed within agent device 100, or agent device 100 may send user data to a remote server for performing the user recognition. For example, the user recognition may be based on audio data (e.g. voice recognition) and/or image data (e.g. face recognition) of the users. Agent device 100 may comprise one or more sensors (e.g. a microphone) to capture the audio data and/or one or more sensors (e.g. a camera) to capture the image data. Generally, agent device 100 may forward user data such as voice commands to a remote server, which interprets the user data and forwards data to agent device 100 for outputting it to the user.

In the situation illustrated in FIG. 1a, agent device 100 operates in the first operation mode. That is, agent device 100 identifies the users A and B it is interacting with. Using user recognition, agent device 100 may serve user A and/or user B at its best capacity. For example, user A may ask agent device 100 if he has any planned appointments. Since agent device 100 identifies user A, agent device 100 may search a calendar of user A for appointments.

FIG. 1b illustrates another situation, in which a third user C is present in the vicinity of agent device 100. User C does not want to be recognized in order to protect his/her privacy. In order to enable privacy for a user, agent device 100 additionally supports a second operation mode in which the agent device is configured to not identify individual users (persons). In other words, agent device 100 does not distinguish between individual users in the second operation mode. That is, agent device 100 does not know about the identity of the user(s) it is interacting with or about the identity of users (persons) in the vicinity of agent device 100 in the second operation mode.

Agent device 100 comprises a receiver circuit 110 configured to receive, from an external device, a signal 101 indicating that a person in the vicinity of agent device 100 does not want to be identified. Further, agent device 100 comprises a control circuit 120 for adjusting an operation mode of agent device 100. Control circuit 120 is configured to set the operation mode of agent device 100 to the second operation mode in response to receiving the signal 101.

In order to indicate to agent device 100 that he/she does not want to be recognized, user C carries or wears a user device 140. User device 140 is configured to emit a signal indicating that the carrier of the user device 140 does not want to be identified. That is, signal 101 received by receiver circuit 110 is the signal emitted by user device 140. For example, the signal emitted by user device 140 may be a radio frequency signal or an ultrasonic signal.

Accordingly, when user C is present in the vicinity of agent device 100, the agent device enters the second operation mode as an incognito (anonymous) mode so that user C (and also the other users A and B) are no longer identifiable. For example, agent device 100 may disable (deactivate) one or more sensors (e.g. a camera or a microphone) used for user recognition while operating in the second operation mode. Alternatively, agent device 100 may fully or at least partly disable (deactivate) the user recognition functionality (i.e. user data is captured like in the first operation mode, but is not processed further for user recognition). As illustrated in FIG. 1*b*, user C can decide to become anonymous by wearing a physical device. User device 140 as an example for an external device may, e.g., be a mobile communication device (such as a smartphone, a tablet-computer, or a laptop) or a wearable (such as a smartwatch, a dongle, optical head-mounted display). Agent device 100 does not need to recognize a user in order to be able to decide that the user does not want to be identified. In other words, the signal 101 does not contain information about the identity of the person. Referring to the situation illustrated in FIG. 1*b*, the signal emitted by user device 140 does not comprise information about the identity of user C.

Further, no physical interaction of user C with agent device 110 is needed. The signal of user device 140 may, e.g., be detected by receiver circuit 110 even before user C enters the room, in which agent device 100 is located. Accordingly, agent device 100 will never recognize (identify) user C.

In some examples, the signal may be provided in a different manner to receiver circuit 110 of agent device 100. For example, signal 101 may be received from an external server by receiver circuit 110. User C may, e.g., carry a smartphone with enabled personal tracking. If user C indicated in his/her user profile that he/she does not want to be identified and if the personal tracking data indicates that user C approaches agent device 100, the server may send the signal to agent device 100 in order to cause agent device to change to the second operation mode.

Control circuit 120 may be configured to keep agent device 100 in the second operation mode as long as signal 101 is received. Alternatively, control circuit 120 may periodically (i.e. at regular time intervals) check for the reception of signal 101 by receiver circuit 110 and, e.g., keep agent device 100 in the second operation mode for a predefined time period after signal 101 was received the last time. Accordingly, privacy of the person may be protected. For example, user device 140 may continuously or periodically emit the signal. On the other hand, if signal 101 is not received by receiver circuit 110, control circuit 120 may be further configured to set the operation mode of agent device 100 to the first operation mode in order to provide best service to users. For example, when user C walks away from agent device 110, signal 101 received by receiver circuit 110 from user device 140 gets weaker with increasing distance between user C and agent device 100 until receiver circuit 110 cannot receive signal 101 anymore. Accordingly, as long as user C is in the vicinity of agent device 100 (e.g. within a predetermined distance to agent device 100), his/her privacy is protected.

When acting in the second operation mode, the functionality (e.g. service quality) of agent device 100 may be limited since agent device 100 does not identify the individual users it is interacting with. For example, agent device 100 cannot provide inform to one of user A, B, and C about planned appointments since agent device 100 does not know about the identity of users A, B, and C in the second operation mode. In order to inform users it is interacting with about the operation in the second operation mode, agent device 100 further comprises a notification circuit 130 configured to output a predefined notification, if agent device 100 operates in the second operation mode. As indicated in FIG. 1*b*, the predefined notification may be a visual notification (e.g. predetermined color or a message is displayed) and/or an acoustic notification (e.g. a predetermined tone or melody is output). By means of notification circuit 130, agent device 100 may clearly indicate to people present that agent device 100 has entered the incognito mode.

Figure 2:
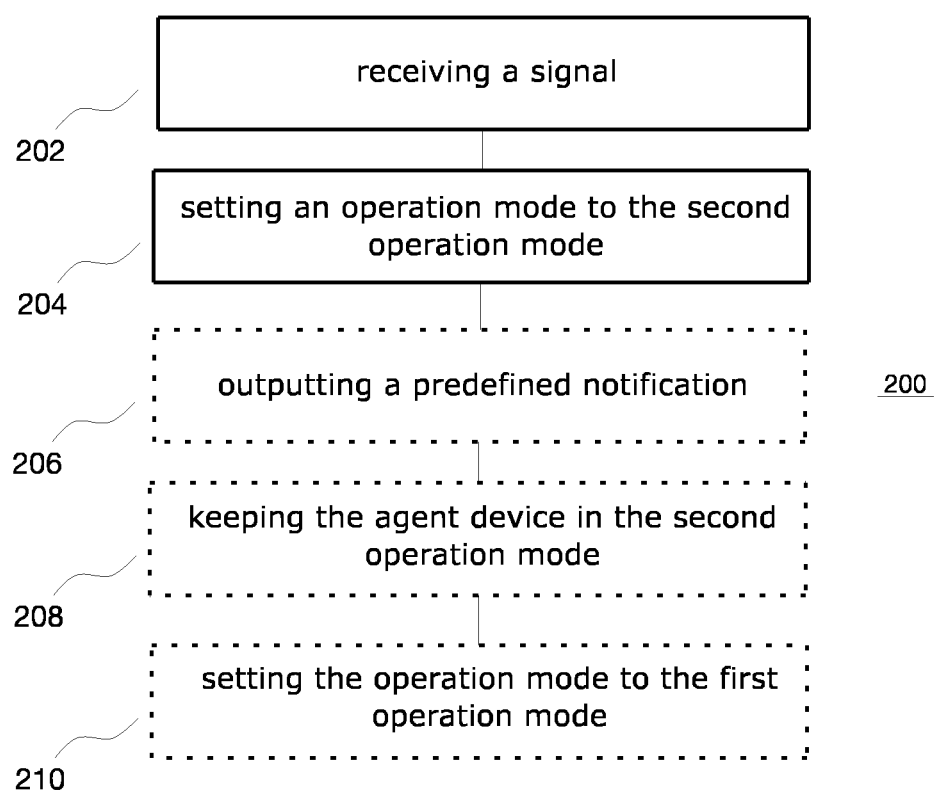
FIG. 2 illustrates a flowchart of a method of operating an agent device for assisting one or more users according to an embodiment.

In order to summarize the above aspects on operating an agent device according to the proposed technique, FIG. 2 illustrates a flowchart of a method 200 of operating an agent device for assisting one or more users. The agent device supports a first operation mode in which the agent device is configured to identify individual users. Further, the agent device supports a second operation mode in which the agent device is configured to not identify individual users.

Method 200 comprises receiving 202, from an external device, a signal indicating that a person in the vicinity of the agent device does not want to be identified. Additionally, method 200 comprises setting 204 an operation mode of the agent device to the second operation mode in response to receiving the signal.

Optionally, method 200 may further comprise outputting 206 a predefined notification if the agent device operates in the second operation mode.

Further, method 200 may comprise keeping 208 the agent device in the second operation mode as long as the signal is received. If the signal is not received, method 200 may comprise setting 210 the operation mode of the agent device to the first operation mode More details and aspects of the method are mentioned in connection with the proposed technique or one or more examples described above (e.g. FIG. 1). The method may comprise one or more additional optional features corresponding to one or more aspects of the proposed technique or one or more examples described above.

The examples as described herein may be summarized as follows:

(1) An agent device for assisting one or more users. The agent device supports a first operation mode in which the agent device is configured to identify individual users. Further, the agent device supports a second operation mode in which the agent device is configured to not identify individual users. The agent device comprises a receiver circuit configured to receive, from an external device, a signal indicating that a person in the vicinity of the agent device does not want to be identified. Additionally, the agent device comprises a control circuit configured to set an operation mode of the agent device to the second operation mode in response to receiving the signal.

(2) The agent device of (1), further comprising a notification circuit configured to output a predefined notification if the agent device operates in the second operation mode.

(3) The agent device of (2), wherein the predefined notification is a visual notification.

(4) The agent device of (2) or (3), wherein the predefined notification is an acoustic notification.

(5) The agent device of any of (1) to (4), wherein the signal is free from information about the identity of the person.

(6) The agent device of any of (1) to (5), wherein the control circuit is further configured to keep the agent device in the second operation mode as long as the signal is received.

(7) The agent device of any of (1) to (6), wherein the control circuit is further configured to set the operation mode of the agent device to the first operation mode if the signal is not received.

(8) The agent device of any of (1) to (7), wherein the external device is one of a mobile communication device, a wearable, or a server.

(9) A system, comprising a user device configured to emit a signal indicating that the carrier of the user device does not want to be identified, and an agent device according to any of (1) to (8).

(10) A method of operating an agent device for assisting one or more users. The agent device supports a first operation mode in which the agent device is configured to identify individual users. Further, the agent device supports a second operation mode in which the agent device is configured to not identify individual users. The method comprises receiving, from an external device, a signal indicating that a person in the vicinity of the agent device does not want to be identified. Additionally, the method comprises setting an operation mode of the agent device to the second operation mode in response to receiving the signal.

(11) The method of (10), further comprising outputting a predefined notification if the agent device operates in the second operation mode.

(12) The method of (11), wherein the predefined notification is a visual notification.

(13) The method of (11) or (12), wherein the predefined notification is an acoustic notification.

(14) The method of any of (10) to (13), wherein the signal is free from information about the identity of the person.

(15) The method of any of (10) to (14), further comprising keeping the agent device in the second operation mode as long as the signal is received.

(16) The method of any of (10) to (15), further comprising setting the operation mode of the agent device to the first operation mode if the signal is not received.

(17) The method any of (10) to (16), wherein the external device is one of a mobile communication device, a wearable, or a server.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

Functions of various elements shown in the figures may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An agent device for assisting one or more users, wherein the agent device supports a first operation mode in which the agent device is configured to identify individual users, and wherein the agent device supports a second operation mode in which the agent device is configured to not identify individual users, the agent device comprising:
    a receiver circuit configured to receive, from an external device independent of the agent device, a signal indicating that a person in the vicinity of the agent device does not want to be identified; and
    a control circuit configured to set an operation mode of the agent device to the second operation mode in response to receiving the signal, wherein, in the second operation mode, the agent device performs anonymous assist functions of assisting individual users without identifying individual users.

2. The agent device of claim 1, further comprising:
    a notification circuit configured to output a predefined notification if the agent device operates in the second operation mode.

3. The agent device of claim 2, wherein the predefined notification is a visual notification.

4. The agent device of claim 2, wherein the predefined notification is an acoustic notification.

5. The agent device of claim 1, wherein the control circuit is further configured to keep the agent device in the second operation mode as long as the signal is received.

6. The agent device of claim 1, wherein the control circuit is further configured to set the operation mode of the agent device to the first operation mode if the signal is not received.

7. The agent device of claim 1, wherein the external device is one of a mobile communication device, a wearable, or a server.

8. A system, comprising:
    a user device configured to emit a signal indicating that the carrier of the user device does not want to be identified; and
    an agent device according to claim 1.

9. The agent device of claim 1, wherein the operation mode of the agent device is set to the second operation mode only on condition that the signal is received.

10. A method of operating an agent device for assisting one or more users, wherein the agent device supports a first operation mode in which the agent device is configured to identify individual users, and wherein the agent device supports a second operation mode in which the agent device is configured to not identify individual users, the method comprising:
    receiving, from an external device independent of the agent device, a signal indicating that a person in the vicinity of the agent device does not want to be identified; and
    setting an operation mode of the agent device to the second operation mode in response to receiving the signal, wherein, in the second operation mode, the agent device performing anonymous assist functions of assisting individual users without identifying individual users.

11. The method of claim 10, further comprising:
    outputting a predefined notification if the agent device operates in the second operation mode.

12. The method of claim 11, wherein the predefined notification is a visual notification.

13. The method of claim 11, wherein the predefined notification is an acoustic notification.

14. The method of claim 10, further comprising:
    keeping the agent device in the second operation mode as long as the signal is received.

15. The method of claim 10, further comprising:
    setting the operation mode of the agent device to the first operation mode if the signal is not received.

16. The method of claim 10, wherein the external device is one of a mobile communication device, a wearable, or a server.

17. The method of claim 10, wherein the operation mode of the agent device is set to the second operation mode only on condition that the signal is received.

* * * * *